United States Patent [19]

Heidorn

[11] 3,719,260

[45] March 6, 1973

[54] ELECTROMAGNETIC CLUTCH

[75] Inventor: John H. Heidorn, Dayton, Ohio

[73] Assignee: General Motors Corporation, Detroit, Mich.

[22] Filed: Dec. 27, 1971

[21] Appl. No.: 212,596

[52] U.S. Cl. ............................................... 192/84 C
[51] Int. Cl. ............................................. F16d 27/10
[58] Field of Search .................................. 192/84 C

[56] References Cited

UNITED STATES PATENTS

| | | | |
|---|---|---|---|
| 3,044,594 | 7/1962 | Bernard | 192/84 C |
| 3,082,933 | 3/1963 | Bernard | 192/84 C X |
| 3,205,989 | 9/1965 | Mantey | 192/84 C |

Primary Examiner—Allan D. Herrmann
Attorney—Warren E. Finken et al.

[57] ABSTRACT

The electromagnetic clutch illustrated includes a coil arrangement wherein the coil housing is formed in part by a portion of an adjacent air-conditioning compressor casing and in part by a portion of a sheet metal pulley assembly, both portions of which serve as a part of the path of the magnetic flux. The clutch elements are such that a six-pole clutch field is included in the clutch path. The overall arrangement permits the pulley groove and clutch bearing to be located substantially closer to the compressor than with the prior art arrangements, thus being adaptable to a shorter output shaft for reducing the tendency toward shaft bending and compressor distortion resulting from belt load.

3 Claims, 2 Drawing Figures

ELECTROMAGNETIC CLUTCH

This invention relates generally to electromagnetic clutches and, more particularly, to a simplified, economical and highly efficient electromagnetic clutch.

An object of the invention is to provide an improved electromagnetic clutch wherein the coil is housed within a minimal volume chamber formed by portions of a sheet metal pulley assembly and of the forward end of an adjacent air-conditioning compressor casing.

Another object of the invention is to provide such an electromagnetic clutch wherein the compressor casing and the pulley assembly form part of the magnetic flux circuit.

A further object of the invention is to provide a pair of clutch elements which produce a six-pole clutch field in the flux circuit.

Still another object of the invention is to provide an improved electromagnetic clutch wherein the pulley groove is located to reduce shaft bending and compressor distortion due to belt load.

A still further object of the invention is to provide an improved electromagnetic clutch wherein the pulley assembly, magnetic pole member and bearing assembly are retained in position with respect to the output shaft by a standard retainer ring without the need for bolts and/or locking lugs.

Figure 1:
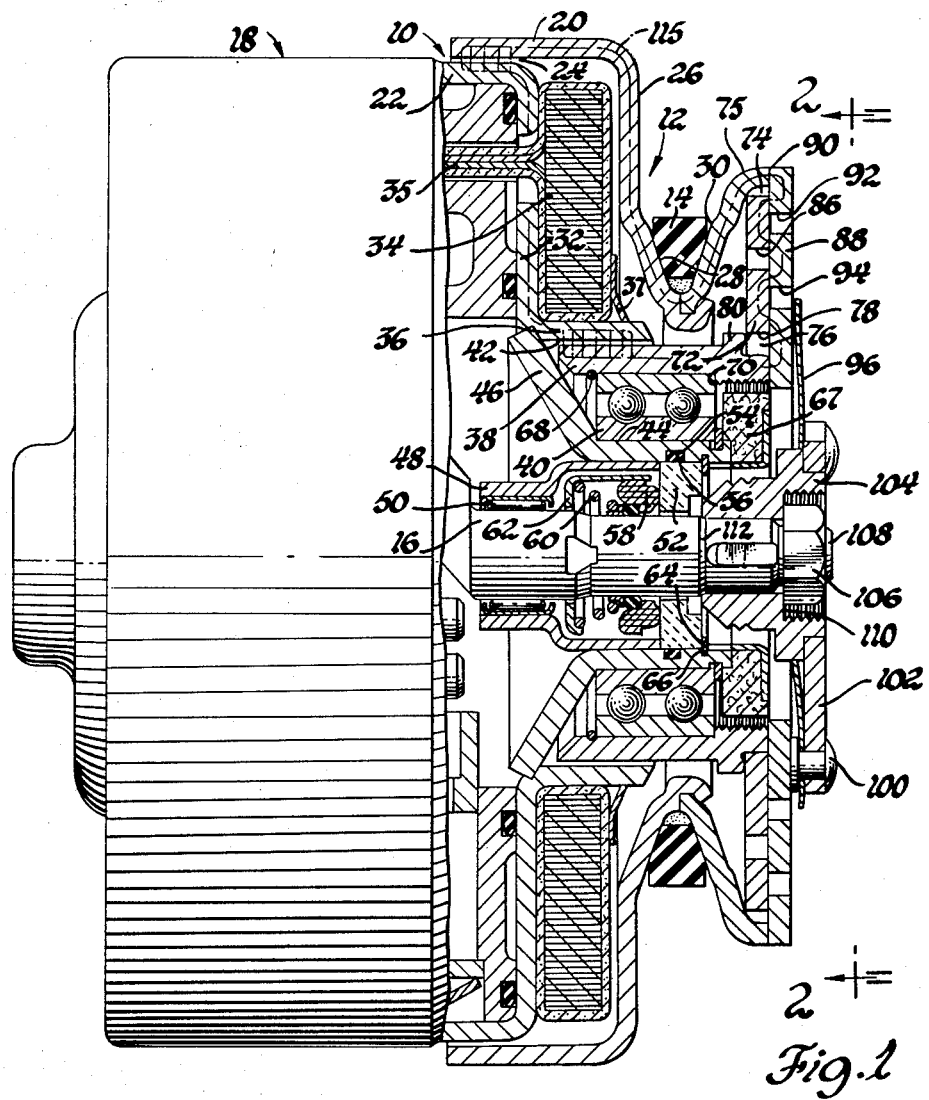
Figure 2:
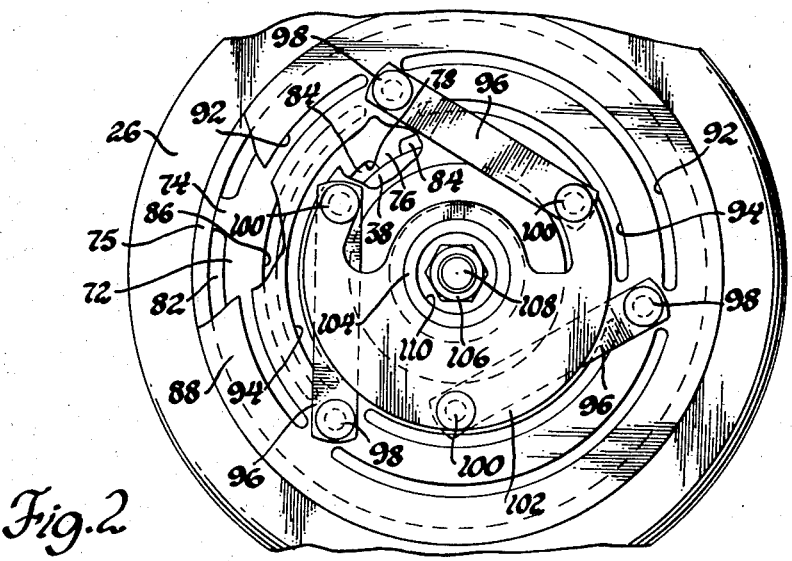

These and other objects and advantages of the invention will be apparent when reference is made to the following description and accompanying drawings, wherein:

FIG. 1 is a fragmentary cross-sectional view of an electromagnetic clutch embodying the invention; and FIG. 2 is a reduced end view in partial cross section taken along the plane of the line 2—2 of FIG. 1, and looking in the direction of the arrows.

Referring now to the drawings in greater detail, FIGS. 1 and 2 illustrate an electromagnetic clutch 10 operable through an input pulley assembly 12 and a drive belt 14 to selectively rotate an output shaft 16 for actuating an engine accessory device, such as an automobile air-conditioning compressor illustrated in part at 18.

The pulley assembly 12 is formed of sheet metal and includes a cylindrical end portion 20 extending freely past the forward end 22 of the compressor 18, a minimal annular gap 24 width away therefrom. A generally radially inwardly extending wall portion 26 of the pulley assembly 12 forms a pulley groove 28 adjacent its radially inner edge with an interconnected sheet metal flange member 30.

The forward wall 32 of the compressor 18 serves as a side wall or cover for an electromagnetic coil 34 surrounded by a suitable potting compound and axially confined between the wall 32 and the radially extending pulley wall 26, with suitable wire leads 35 extending through an opening formed in the wall 32. The coil 34 is confined radially between the cylindrical pulley end portion 20 and a hub member 36 formed on the compressor forward wall 32. The particular coil 34 illustrated is formed of approximately 350 turns of 0.004 inch thick aluminum foil. A bracket 37 secured to the hub member 36 retains the coil 34 against the wall 32.

A sleeve member 38 is rotatably mounted on a bearing 40 radially within the hub member 36, there being a minimal gap 42 width between the hub and sleeve members 36 and 38, respectively. The bearing 40 is mounted on a sleeve support member 44, the sleeve support member 44 having a conical flange 46 formed on the inner end thereof for connection with the forward compressor wall 32 by any suitable means, such as welding.

An inner sheet metal sleeve member 48 is secured by welding within the sleeve support member 44 and is supported on the output shaft 16 by needle bearings 50 at the inner or compressor end thereof and by a stationary seal ring 52 mounted within the sleeve support member 44 adjacent the outer edge of the inner sleeve member 48. An O-ring seal 54 is mounted around the stationary seal ring 52 in a groove 56 formed in the sleeve support member 44. A rotating shaft seal 58 is mounted on the output shaft 16 within the inner sleeve member 48 and urged into contact with the stationary seal ring 52 by a spring 60 supported by a spring retainer 62 mounted around the output shaft 16. A retainer ring 64 mounted in an annular groove 66 formed in the sleeve support member 44 serves as a stop for axially retaining the stationary seal ring 52 within the sleeve support member 44. A felt seal 67 may be mounted within the sleeve member 38 adjacent the bearing 40.

The conical flange 46 and retaining ring 64 serve to axially position the bearing 40 on the sleeve support member 44, and a retainer ring 68 and a shoulder 70 within the sleeve member 38 serve to axially position the latter on the bearing 40. It may be noted that the pulley groove 28 and, hence, the drive belt 14 are located in substantial radial alignment with the bearing 40 for better wear characteristics.

A magnetic pole member 72 is secured at a plurality of spaced bosses 74 (FIG. 2) formed around the outer periphery thereof to the inner surface of an axially extending end portion 75 of the pulley assembly flange member 30 in any suitable manner, such as welding, and further secured at spaced bosses 76 (FIG. 2) formed around a central opening 78 thereof to the forward end of the sleeve member 38 adjacent a collar 80 formed in the latter. As a result of the spaced bosses 74, there is formed a plurality of arcuate-shaped annular spaces or passages 82 (FIG. 2) intermediate the end portion 75 of the pulley flange end 30 and the pole member 72. There also results a plurality of arcuate-shaped annular spaces 84 intermediate the central opening 78 of the pole member 72 and the sleeve member 38 by virtue of the location of the bosses 76. A plurality of equally spaced arcuate slots 86 (FIG. 2) are formed around an intermediate portion of the pole member 72.

An armature plate 88 is shown in a deenergized position in FIG. 1 adjacent the outer face of the pole member 72 and the edge of an axially extending end portion 75 of the pulley flange member 30, there being a variable width radially extending gap 90 therebetween. Two concentric rows of equally spaced arcuate slots 92 and 94 are formed in the armature plate 88, located radially outward and inward, respectively, of the adjacent arcuate slots 86 formed in the pole member 72. It may be noted that a six-pole clutch field has resulted from the alternately spaced slots 82, 92, 86, 94, and 84.

A plurality of leaf springs 96 (FIG. 2) are each secured by rivets 98 at one end thereof to the armature plate 88 and at the other end thereof by rivets 100 to a support plate 102 welded to a hub member 104 mounted around the end of the output shaft 16. A nut 106 is threadedly mounted on a threaded end 108 of the output shaft 16, abutting against the bottom of a recess 110 formed in the hub member 104, causing the inner end of the hub member 104 to abut against a shoulder 112 formed on the output shaft 16.

OPERATION

In operation, the clutch 10 is engaged by the energization of the electromagnetic coil 34 which causes magnetic flux to traverse a path through the adjacent paramagnetic materials, as indicated by the dot-dash line 115 (FIG. 1). More specifically, the path of the flux is primarily from the coil 34 to the adjacent hub and cover members 36 and 32, respectively, and thence across the gap 24 into the pulley end portion 20. Thus it may be noted that the compressor casing is used as a part of the clutch magnetic circuit.

The flux thereupon proceeds along the radially extending pulley wall 26, the pulley groove 28 and the flange member 30 to the axially extending end portion 75 thereof, bypassing the pole member 72 at this point by virtue of the intermediate annular spaces 82. The flux next traverses a serpentine path through the six-pole clutch field resulting from the spaced relationship of the alternately located arcuate slots 82, 92, 86, and 84 formed in and/or radially adjacent the pole member 72 and the armature plate 88. More specifically, the flux first crosses the adjacent radial gap 90 from the pulley end portion 75 to enter the radial outer portion of the armature plate 88, from whence it once again crosses the radially extending gap 90 to the radial outer portion of the magnetic pole member 72. Then, the flux alternately crosses the gap 90 to the intermediate portion of the armature plate 88 and thence back and forth across the gap 90 to the intermediate portion of the magnetic pole member 72 and the radial inner portion of the armature plate 88, prior to entering the sleeve member 38 to complete the cycle by crossing the gap 42 to the adjacent hub member 36.

This arrangement provides a strong, six-pole magnetic clutch field between the armature plate 88 and the pole member 72 in conjunction with the adjacent flange and sleeve members 30 and 38, respectively, resulting in a face-to-face engagement between the armature plate 88 and the pole member 72, against the force of the springs 96, which efficiently rotates the output shaft 16 to thus drive the compressor 18.

When the coil 34 is deenergized, nulling the magnetic attraction across the variable-width gap 90, the springs 96 pull the armature plate 88 away from the pole member 72, through the maximum width of the gap 90.

It should be apparent that by using the forward end portion of the compressor housing as a cover for the clutch coil, the compressor not only serves as a portion of the flux path but also results in the use of a shorter, stiffer compressor shaft, eliminating the need for precise grinding and balancing, as well as a substantially shortened pulley groove-to-compressor distance, thus reducing the tendency toward compressor distortion from belt whip and pull. With the bearings substantially radially aligned with the pulley groove, closer to the compressor center than with the usual clutch, shaft bending and fatigue stresses are reduced.

While but one embodiment of the invention has been shown and described, other modifications thereof are possible.

I claim:

1. For use with an air-conditioning compressor including a casing having a hub member extending from an end face thereof, an electromagnetic clutch comprising a sheet metal pulley assembly, said pulley assembly having a cylindrical end portion freely mounted around an end portion of said compressor casing, an output shaft extending into said compressor casing, an electromagnetic coil mounted on said hub member closely adjacent said compressor end face and the inner surfaces of said pulley assembly such that said hub member, said compressor end face and said pulley assembly serve as a portion of the magnetic flux path when said coil is energized, first clutch means mounted closely adjacent said hub member, bearing means for rotatably mounting said first clutch means on said output shaft, second clutch means, resilient means operatively connected to said output shaft and to said second clutch means for urging said second clutch means away from said first clutch means, a first plurality of annular slots formed in said first clutch means, a second plurality of annular slots formed in said second clutch means, said first and second pluralities of annular slots forming a six-pole magnetic clutch field between said first and second clutch means to complete said flux path.

2. For use with an air-conditioning compressor having a casing, an electromagnetic clutch comprising a sheet metal pulley assembly having first and second cylindrical end portions formed thereon and an intermediate radially inwardly positioned pulley groove, said first pulley cylindrical end portion being freely mounted around an end portion of said compressor casing, first and second concentric cylindrical hub members formed on an end face of said compressor casing, an electromagnetic coil mounted so as to abut against the outer surfaces of said first cylindrical hub member and said compressor end face and to be spaced slightly apart from said first pulley cylindrical end portion and said pulley groove of said pulley assembly, a first clutch element secured at the outer periphery thereof to the inner surface of said second pulley cylindrical end portion, a sleeve member secured to the inner periphery of said second pulley cylindrical end portion and extending axially intermediate said first and second cylindrical hub members a minimal annular gap width away from said first cylindrical hub member, a bearing mounted intermediate said second cylindrical hub member and said sleeve member, an output shaft extending axially through said second cylindrical hub member, sealing means mounted intermediate said output shaft and the inner surface of said second cylindrical hub member, a support member mounted on the end of said output shaft, a second clutch element mounted for axial resilient movement on said output shaft, first, second and third pluralities of equally spaced arcuate slots formed in said first clutch element, fourth and fifth pluralities of equally spaced arcuate slots formed in said second clutch element in alternate radial locations relative to said first, second and third pluralities of arcuate slots for providing a six-pole magnetic flux path between said first and second clutch elements.

3. For use with an air-conditioning compressor having a casing, an electromagnetic clutch comprising a sheet metal pulley assembly having a cylindrical end portion, a wall portion extending radially inwardly from said pulley cylindrical end portion, a first pulley groove side wall formed on the inner end of said wall portion, a second pulley groove side wall secured to said first pulley groove side wall, and an axially extending outer edge formed on said second pulley groove side wall, said pulley cylindrical end portion being freely mounted around an end portion of said compressor casing, a first cylindrical hub member formed on an end face of said compressor casing, an electromagnetic coil mounted on the outer surfaces of said first cylindrical hub member and said compressor end face a predetermined space width apart from said cylindrical pulley end portion and said radially extending wall portion of said pulley assembly, a first clutch element having a first plurality of spaced bosses formed around the outer periphery thereof and secured to the inner surface of said axially extending pulley edge portion, a second plurality of spaced bosses formed around the inner periphery of said first clutch element, a sleeve member secured to said second plurality of bosses and extending axially into said first cylindrical hub member a minimal annular gap width away therefrom, a second cylindrical hub member secured to said end face of said compressor casing, a bearing mounted intermediate said second cylindrical hub member and said sleeve member, an output shaft extending axially through said second cylindrical hub member, sealing means mounted intermediate said output shaft and the inner surface of said second cylindrical hub member, a support member mounted on the end of said output shaft, a locknut for retaining said support member in position on said output shaft, a second clutch element mounted adjacent said first clutch element and the ends of said sleeve member and said axially extending pulley edge portion, a plurality of springs each connected at one end thereof to said second clutch element and at the other end thereof to said support member for urging said second clutch element away from said first clutch element, a first plurality of equally spaced arcuate slots formed in said first clutch element at an intermediate radial location thereon, second and third pluralities of equally spaced arcuate slots formed in said second clutch element radially outwardly and radially inwardly, respectively, of said first plurality of equally spaced arcuate slots, said first, second, and third pluralities of equally spaced arcuate slots and the spaces intermediate said first and second pluralities of bosses resulting in a six-pole magnetic flux path between said second clutch element and said first clutch element and said adjacent edges of said sleeve member and said axially extending pulley portion.

* * * * *